(12) United States Patent
Noonan et al.

(10) Patent No.: US 7,069,401 B1
(45) Date of Patent: Jun. 27, 2006

(54) MANAGEMENT OF FROZEN IMAGES

(75) Inventors: Terence W. Noonan, Vadnais Heights, MN (US); Sinh D. Nguyen, Eden Prairie, MN (US); John P. Moore, Mound, MN (US)

(73) Assignee: Veritas Operating Corporating, Mountain View, CA (US)

(*) Notice: Subject to any disclaimer, the term of this patent is extended or adjusted under 35 U.S.C. 154(b) by 275 days.

(21) Appl. No.: 10/246,356

(22) Filed: Sep. 18, 2002

(51) Int. Cl.
*G06F 12/00* (2006.01)

(52) U.S. Cl. .................. 711/162; 711/161; 707/202; 707/203; 707/204; 714/6; 714/13; 714/15; 714/19; 714/20

(58) Field of Classification Search ............... 711/162, 711/161; 707/202, 203, 204; 714/6, 13, 714/15, 19, 20
See application file for complete search history.

(56) References Cited

U.S. PATENT DOCUMENTS

| | | | | |
|---|---|---|---|---|
| 5,455,946 A | * | 10/1995 | Mohan et al. | 707/202 |
| 5,604,862 A | * | 2/1997 | Midgely et al. | 714/6 |
| 5,649,152 A | | 7/1997 | Ohran et al. | 395/441 |
| 5,835,953 A | | 11/1998 | Ohran | 711/162 |
| 6,073,222 A | | 6/2000 | Ohran | 711/162 |
| 6,085,298 A | | 7/2000 | Ohran | 711/162 |
| 6,253,212 B1 | * | 6/2001 | Loaiza et al. | 707/202 |
| 6,332,200 B1 | * | 12/2001 | Meth et al. | 714/16 |
| 6,366,987 B1 | * | 4/2002 | Tzelnic et al. | 711/162 |
| 6,549,992 B1 | * | 4/2003 | Armangau et al. | 711/162 |
| 6,678,704 B1 | * | 1/2004 | Bridge et al. | 707/202 |
| 6,691,245 B1 | * | 2/2004 | DeKoning | 714/6 |
| 6,694,413 B1 | * | 2/2004 | Mimatsu et al. | 711/162 |

OTHER PUBLICATIONS

Extracting delta for incremental data warehouse maintenance□□Ram, P.; Do, L.; Data Engineering, 2000. Proceedings. 16th International Conference on , Feb. 29-Mar. 3, 2000 □□pp.: 220-229.*
Log File Management IBM Technical Disclosure Bulletin, Feb. 1995, US; vol. 38; Issue 2; p. 527-528; Pub. Date: Feb. 1, 1995.*

* cited by examiner

*Primary Examiner*—Donald Sparks
*Assistant Examiner*—Bao Q. Truong
(74) *Attorney, Agent, or Firm*—Campbell Stephenson Ascolese LLP; D'Ann Naylor Rifai

(57) ABSTRACT

A method, system, and computer program product that enable integrated scheduling and management of frozen images for backup and recovery purposes. Frozen images are created, cataloged, and managed in accordance with a backup policy including a schedule for generating frozen images. Minimal data are saved to allow fast synchronization of the persistent frozen images with production data, and frozen images are cataloged in a catalog that may include entries for other types of backups to provide a single source of information for all backups of production data.

24 Claims, 14 Drawing Sheets

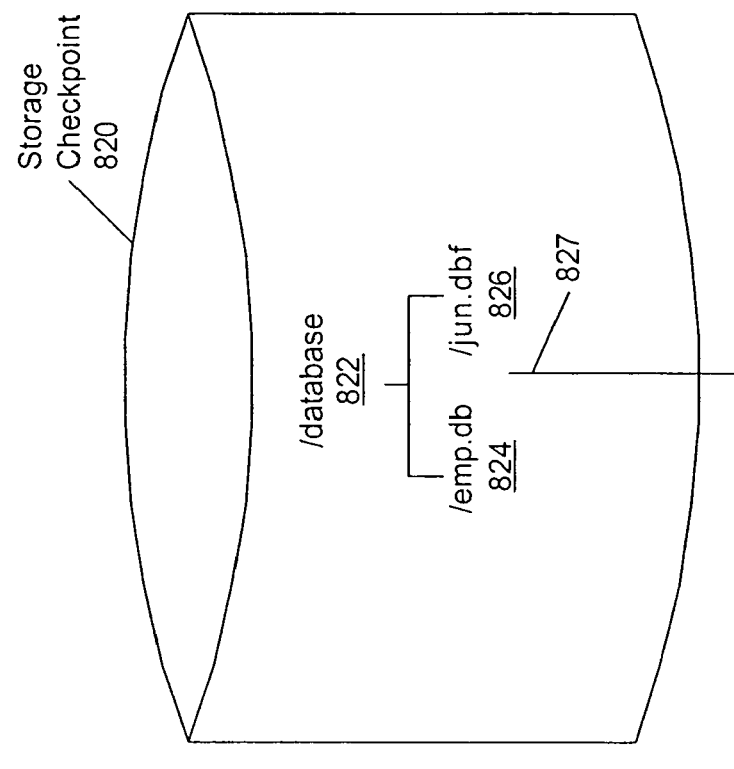
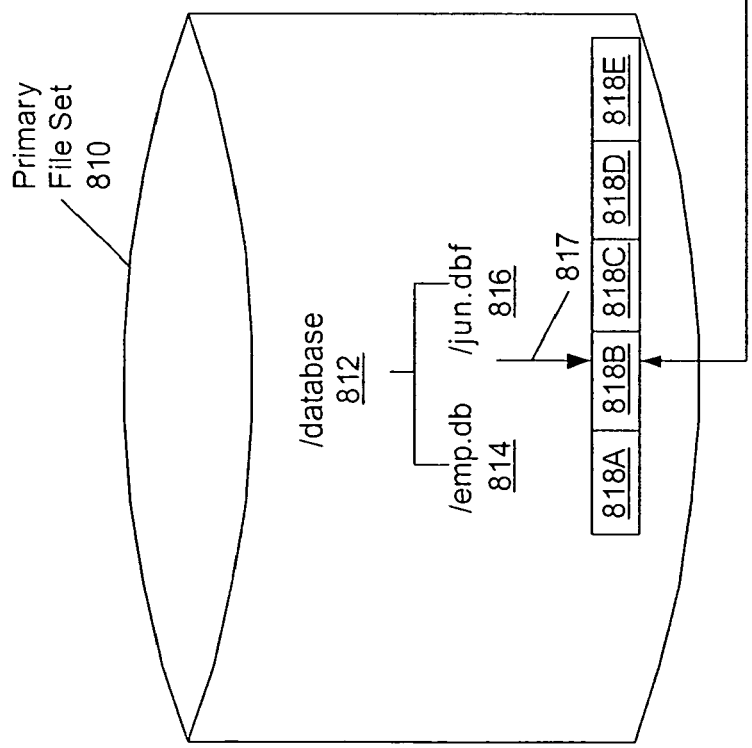
FIG. 8

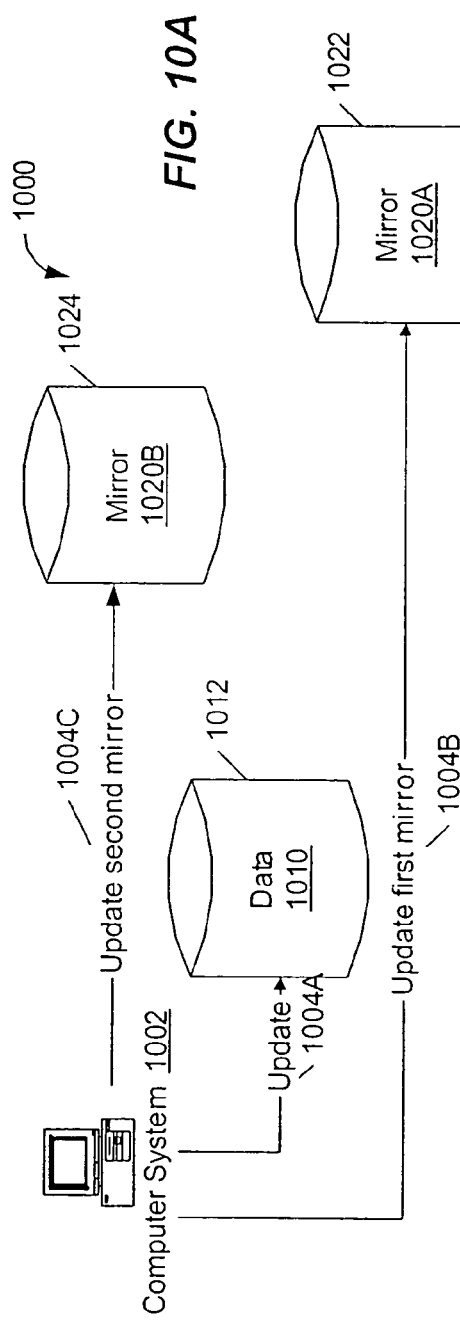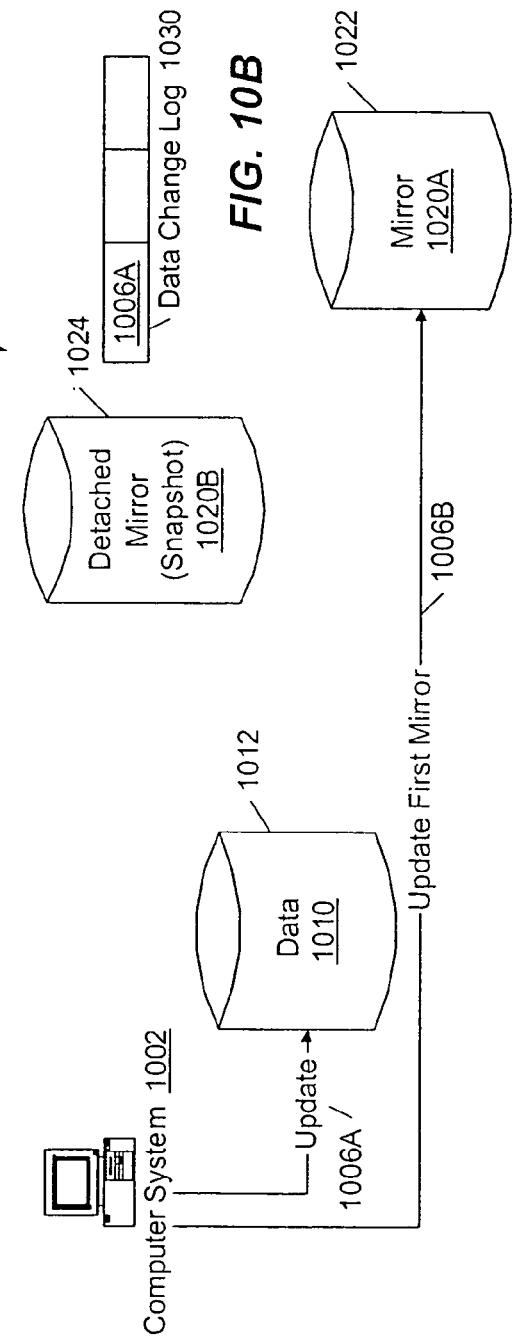

MANAGEMENT OF FROZEN IMAGES

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

The present invention relates to managing backups of production data, and more particularly, to providing and managing frozen images of production data.

2. Description of the Related Art

Information drives business. For businesses that increasingly depend on data and information for their day-to-day operations, unplanned downtime due to data loss or data corruption can hurt their reputations and bottom lines. Data can be corrupted or lost due to hardware and/or software failure, as well as due to user error. For example, a user may inadvertently delete a file, write incorrect data to a file, or otherwise corrupt data or equipment. When such errors occur, productivity is lost for both the technicians that must restore data as well as for users that are unable to access valid data.

Businesses are becoming increasingly aware of these costs and are taking measures to plan for and recover from data loss. Often these measures include protecting primary, or production, data, which is 'live' data used for operation of the business. Copies of primary data, also called backups, are made on different physical storage devices, and often at remote locations, to ensure that a version of the primary data is consistently and continuously available.

Typical uses of copies of primary data include backup, Decision Support Systems (DSS) data extraction and reports, testing, and trial failover (i.e., testing failure of hardware or software and resuming operations of the hardware or software on a second set of hardware or software). These copies of data are preferably updated as often as possible so that the copies can be used in the event that primary data are corrupted, lost, or otherwise need to be restored.

Two areas of concern when a user error or hardware or software failure occurs, as well as during the subsequent recovery, are preventing data loss and maintaining data consistency between primary and backup data storage areas. One simple strategy includes backing up data onto a storage medium such as a tape, with copies stored in an offsite vault. Duplicate copies of backup tapes may be stored onsite and offsite. However, recovering data from backup tapes requires sequentially reading the tapes. Recovering large amounts of data can take weeks or even months, which can be unacceptable in today's 24×7 business environment.

Large active databases and file systems available around-the-clock are difficult to back up without incurring a significant penalty. Often, the penalty takes one of two forms:

The entire database or file system is taken offline to allow time for the data to be copied, resulting in suspension of service and inconvenience to users. For mission-critical applications, taking the application offline may be impossible.

The copy is made very quickly but produces an incomplete or inconsistent version of the data, because some transactions are in progress and are not yet complete.

A way to make backups without incurring such penalties is desired.

More robust, but more complex, solutions include mirroring data from a primary data storage area to a backup, or "mirror," storage area in real time as updates are made to the primary data. Periodic "snapshots" of data may be taken by "detaching" a mirror being updated in real time so that it is no longer updated. Detaching the mirror involves halting transactions being applied to the primary data storage area and to the mirror for a very brief time period to allow existing transactions to complete. The snapshot is then taken and provides a logically consistent copy of the primary data. A logically consistent copy of data is referred to herein as a frozen image. The snapshot serves as a frozen image of the primary data as of the point in time that the snapshot was taken. However, snapshots are typically created manually on an as-needed basis and for a specific purpose rather than on a regular schedule.

Most organizations implement a backup policy to keep copies of data for recovery purposes in the event of a system failure or a site becoming unavailable. One or more backup management systems automatically schedules and performs backups in accordance with the backup policy. However, even backup management systems are typically designed to manage only backups to a specific type of storage area (which may span more than one physical storage device), and no single system exists to integrate the different types of backups made. Furthermore, the backup policy is not managed by a single system, but different portions of the backup policy are managed by respective media backup managers.

FIG. 1A shows an example of a typical environment in which backups are made. No integrated system for producing backups exist. Instead, different types of backups are made by different backup management systems, and no single system implements a backup policy. Tape backup manager 111 is responsible for making tape backups of production data, such as data from production file system 122P and production database 132P. Backup tape 112T represents a backup tape produced by tape backup manager 111. Tape backup manager operates according to a corresponding tape backup schedule 118. Tapes are cataloged in tape catalog 116.

File system manager 120 includes a file system backup manager 121 to produce backup copies of file system data, such as backup file system 122B, from production file system 122P. File system backup manager 121 may access file system catalog 126 and file system backup schedule 128 to produce backup file system 122B.

Database management system 130 includes a database backup manager 131 to produce backup copies of production database 132P. Database backup manager 131 may access database catalog 136, or a similar structure (not shown) providing a list of all databases and tables managed by database management system 130. Database backup manager 131 may also access database backup schedule 138 to produce backup database 132B.

Note that each of these three backup systems follows a respective backup schedule and may access a different catalog. No single system produces backups for all types of data and all types of storage areas, and backups of all data are not created on an integrated schedule. Three different backup managers must be accessed to obtain a complete picture of backup data available, and backups are not managed by a common system.

What is needed is a solution to provide complete and accurate backup copies of production data with as little disruption to production systems as is possible. The solution should provide for scheduling and management of all backups, regardless of the type of storage medium or organization of data for storing the backup. The solution should take advantage of existing frozen images that have already been created, such as snapshots taken for other purposes. Preferably the solution provides quick recovery of data from backups in the event of user error or hardware or software failures.

SUMMARY OF THE INVENTION

The present invention relates to a method, system, and computer program product that enable integrated scheduling and management of frozen images for the purpose of backup and recovery. Frozen images are cataloged when they are generated and managed in accordance with a backup policy including a schedule for generating frozen images. Minimal data are saved to allow fast synchronization of the frozen images with production data, and frozen images are cataloged in a catalog that may include entries for other types of backups to provide a single source of information for all backups of production data.

BRIEF DESCRIPTION OF THE DRAWINGS

The present invention may be better understood, and its numerous objects, features and advantages made apparent to those skilled in the art by referencing the accompanying drawings.

FIG. 8 shows a primary file set and an associated storage checkpoint.

FIG. 10A shows production data being backed up to two mirrors.

FIG. 10B shows detaching a mirror from a primary file set to produce a snapshot.

The use of the same reference symbols in different drawings indicates similar or identical items.

DETAILED DESCRIPTION

For a thorough understanding of the subject invention, refer to the following Detailed Description, including the appended claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention provides a method, system, and computer program product to capture and manage frozen images. Frozen images are cataloged when they are generated and managed in accordance with a backup policy including a schedule for generating frozen images. Minimal data are saved to allow fast synchronization of the frozen images with production data, and frozen images are cataloged in a catalog that may include entries for other types of backups to provide a single source of information for all backups of production data. The backup policy may also include other schedules for making other types of backups, such as tape backups, of the data.

The establishment of a policy to create frequent frozen images of data allows for the implementation of administrator recovery, "undelete" and "undo change" capabilities. For instance, if frozen images are made of file server directories frequently, a file accidentally deleted or incorrectly modified can be "rolled back" to a known state by using a backup management system to restore the file from the frozen image to the primary file system.

In one embodiment, a backup management system includes a frozen image services module to integrate frozen image technologies with implementation of a backup policy. Existing capabilities of the backup management system to create frozen images are combined with catalog functionality of the frozen image services module.

Figure 1A:
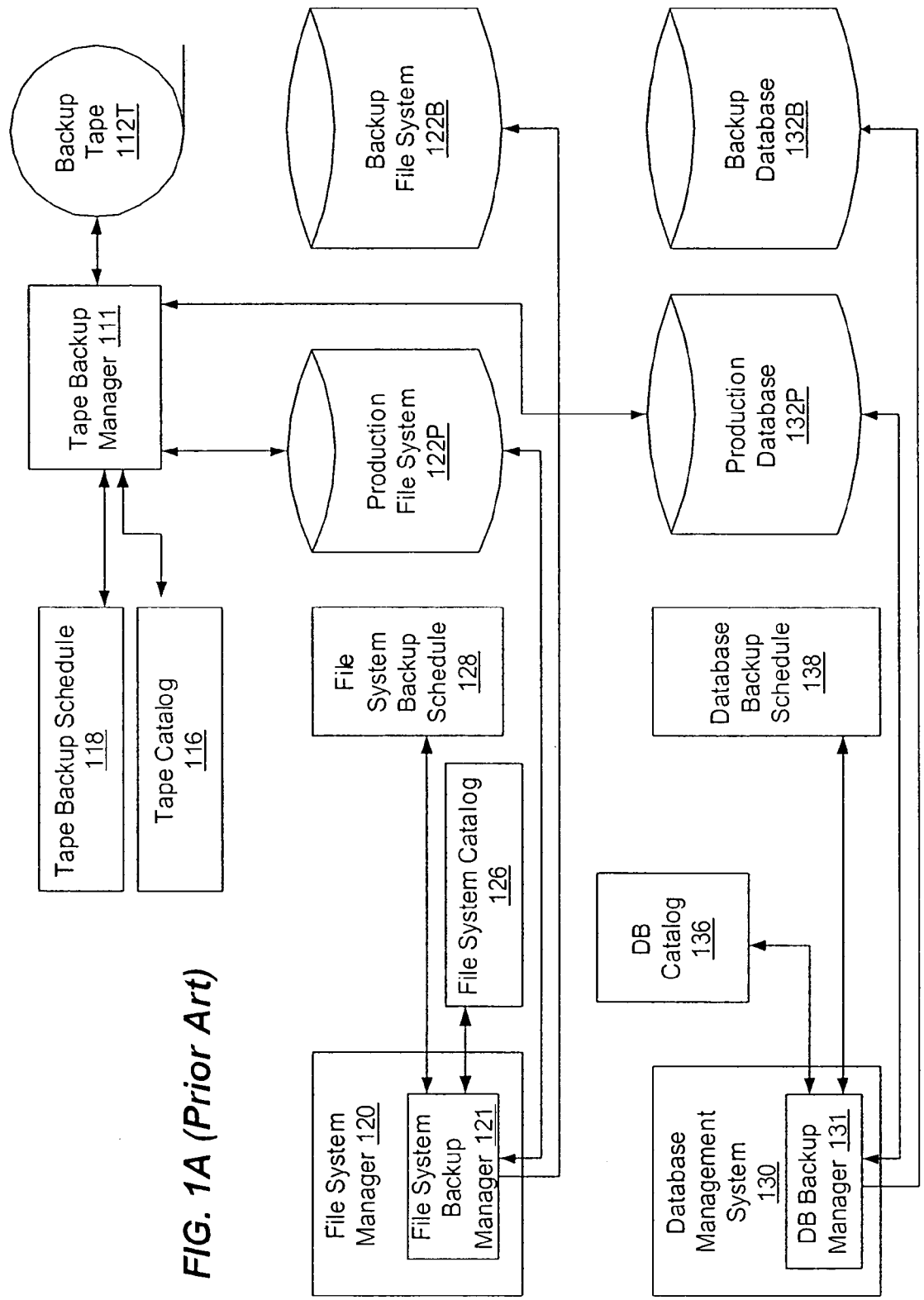
FIG. 1A shows a typical environment in which backups of production data are made, as described above.
Figure 1B:
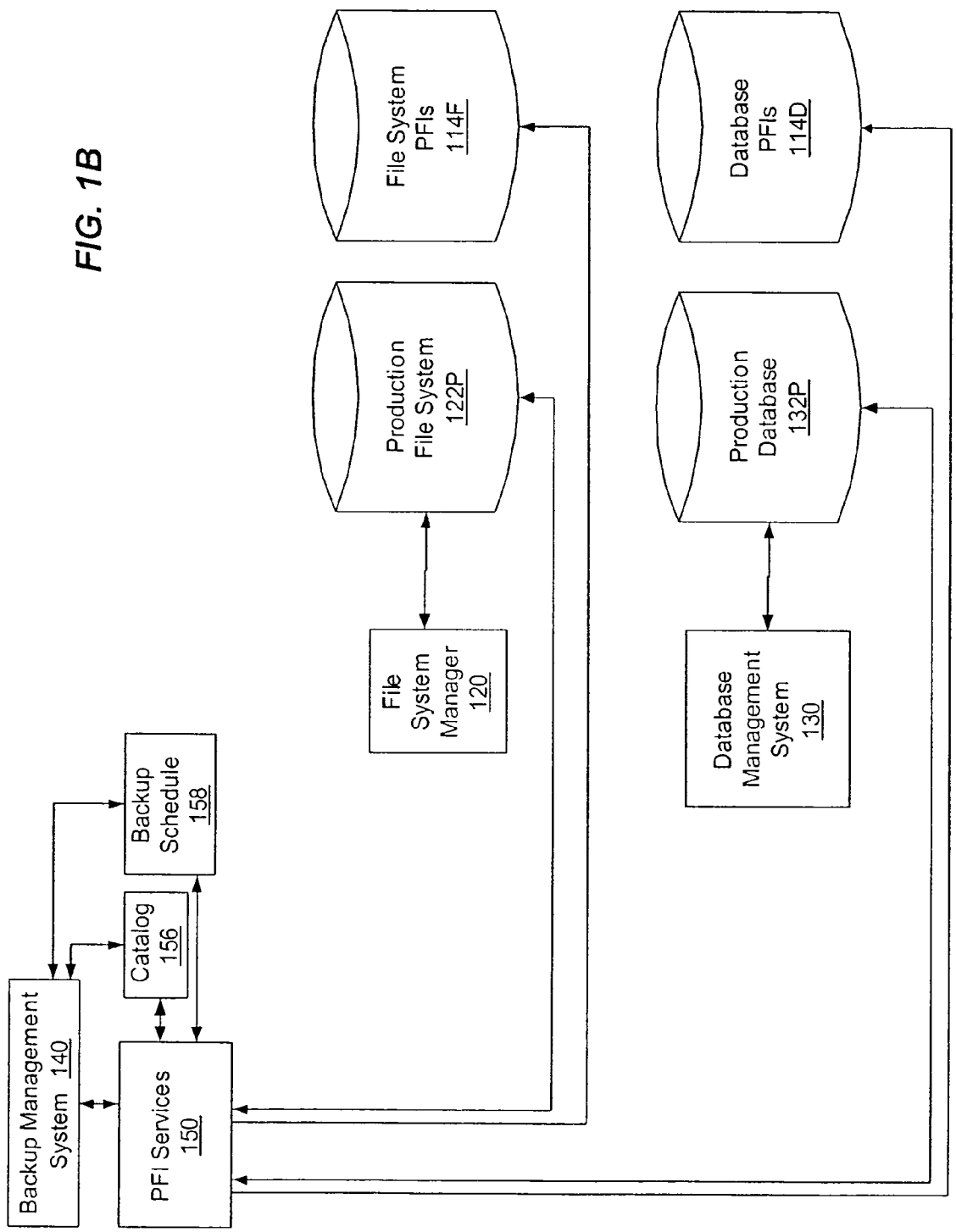
FIG. 1B provides an example of a backup management system and frozen image service that operates in accordance with the present invention.

FIG. 1B shows a backup management system that operates in accordance with the present invention. Backup management system 140 works in conjunction with Persistent Frozen Images (PFI) services 150 to produce and manage persistent frozen images for data stored in production file system 122P and production database 132P. One of skill in the art will recognize that other types of production data are within the scope of the present invention, and that the examples shown are for illustration purposes and are not intended to limit the scope of the invention.

The term persistent is used herein to indicate that data are stored persistently even when the storage medium, or a computer system controlling the storage medium, loses power or fails. Frozen images are generated in storage areas on a direct access persistent storage medium, such as one or more disks, and are sometimes referred to herein as persistent frozen images (PFIs). The storage devices for persistent frozen images can be geographically distributed for disaster recovery purposes. The present invention therefore lessens, and may eliminate, the need for backups made to tape, such as backup tape 112T of FIG. 1A.

Referring again to FIG. 1B, catalog 156 is used for storing information about each persistent frozen image, regardless of the type of data management system managing the actual production data or the organization of the data. One of skill in the art will recognize that catalog 156 can take form as a database, one or more database tables, one or more files, a directory of files, or as one of more other forms of storage.

The example data management systems provided in FIG. 1B include file system manager 120 and database management system 130. Note that backup management system 140 and PFI services 150 do not take the place of these production data management systems. Instead, backup management system 140 and PFI services 150 cause generation of frozen images of data from the production data management systems, including frozen images file system PFIs 114F and database PFIs 114D. While persistent frozen images 114F and 114D are shown as stored on separate storage devices, different types of persistent frozen images can be stored in a single storage area on one or more storage devices. Furthermore, in one embodiment, persistent frozen images are stored in the same storage area as the production data itself.

Furthermore, backup management system 140 and PFI services 150 operate in accordance with a common backup schedule 158 for all types of production data. Persistent frozen images of all types are made in accordance with a common schedule and managed by a single system, thereby enabling an administrator to access the current state of all backups of production data. This access is accomplished using an integrated backup management system and persistent frozen image services, rather than accessing different backup management systems for each type of production data.

Frozen Images

A frozen image includes data captured at a point in time when the data included in the frozen image are logically consistent with the primary data from which the frozen image is generated. The frozen image may include a complete copy of the data or sufficient information for a complete copy of the data to be reconstructed. A frozen image can be made prior to backing up the data to a remote storage device or tape. Such an image is important for data such as data stored in file systems and active databases, where updates to files or tables can occur at any time. For some types of backups, making a logically consistent frozen image is a prerequisite to making a correct backup. The large amounts of data regularly captured in frozen images should be cataloged and made available for backup and recovery purposes.

Types of frozen images supported by the persistent frozen image services of the present invention include, but are not limited to, storage checkpoints and snapshots. Storage checkpoints are created by identifying and maintaining only the data blocks that have changed since the last checkpoint was made. Because only a portion of the data is saved, storage checkpoints require minimal disk space for storage and speed the process of synchronizing data from the storage checkpoint with primary data.

Unlike a storage checkpoint, a snapshot is a complete copy of data. The snapshot is made from data in a storage area on one or more primary or source storage devices and stored in a secondary storage area on one or more separate secondary storage devices, physically independent of the source storage devices and at least equal in size to the primary storage area.

An example of one implementation of storage checkpoints and snapshots is described in further detail below with reference to FIGS. 8 through 10.

Management of Multiple Versions of Persistent Frozen Images

Backup management system 140 works in conjunction with Persistent Frozen Images (PFI) services 150 to produce and manage persistent frozen images of data. PFI services 150 manages not only the backup and restoration processes, but also multiple versions of persistent frozen images. For example, storage checkpoints are aged, and volumes of snapshots can be logically rotated to store multiple versions of production data.

Figure 2:
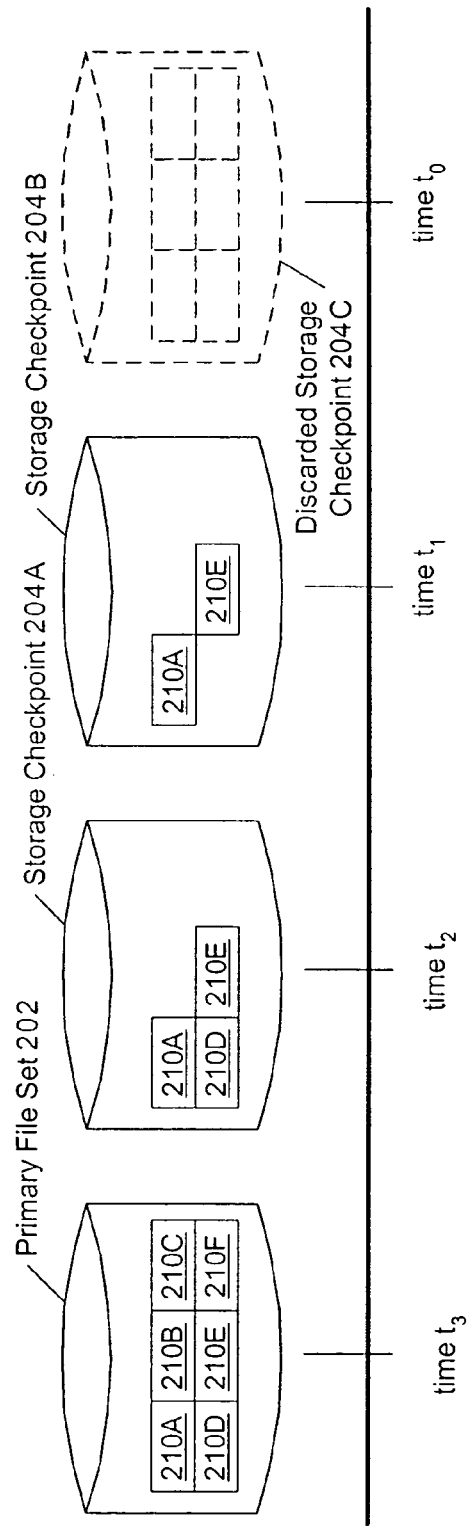
FIG. 2 shows aging of frozen images in the form of storage checkpoints.

FIG. 2 shows "aging" of storage checkpoints, assuming that a maximum of two storage checkpoints and time intervals $t_i$ between creation of storage checkpoints are specified by a backup policy including a schedule for generating storage checkpoints. At each scheduled time interval, a new storage checkpoint is created. In one embodiment, the time intervals are at fixed time intervals, but time intervals can be of variable length in accordance with the needs of the organization. Changed data blocks are copied from the primary file set 202 to the most recently established PFI storage checkpoint until the next storage checkpoint is taken. Primary file set 202 includes data blocks 210A through 210F.

Storage checkpoint 204A created at time $t_2$ includes three data blocks, 210A, 210D, and 210E that changed between times $t_2$ and t. Storage checkpoint 202C created at time $t_1$ includes two data blocks, 210A and 210E, that changed between times $t_1$ and $t_0$. Because only two checkpoints are maintained according to the backup policy, when a new checkpoint is created at time $t_2$, the oldest checkpoint, created at time $t_0$, is discarded. The discarded storage checkpoint, represented by checkpoint 204D, is shown in dotted lines to indicate that it is no longer an active storage checkpoint.

In one embodiment, a storage checkpoint persistent frozen image is created in a storage area on one or more storage devices managed by a client computer system, such as a computer system hosting production file system 122P or a computer system hosting database management system 130. The persistent frozen image is also cataloged. No data are moved from the client devices managing the storage checkpoint persistent frozen images to implement aging of storage checkpoints as shown in FIG. 2.

Several operations, such as the removal of a file or the overwriting of an existing file, can fail when a file system containing storage checkpoints runs out of space. For example, storage checkpoints may cause a data block copy, which in turn may require that additional storage space be allocated to store the storage checkpoint. If sufficient space cannot be allocated, the operation can fail without serious effects on the overall system.

Some applications, such as database applications, pre-allocate storage space for files managed by the application, and write operations are not allowed to fail. If a file system runs out of space, storage checkpoints can be automatically removed and the write operation completed after sufficient space becomes available.

One embodiment is configured to use the following safeguards when automatically removing storage checkpoints:

1. Remove as few storage checkpoints as possible to complete the operation.
2. Check whether a storage checkpoint is removable before removing the storage checkpoint, because some storage checkpoints can be configured as non-removable storage checkpoints.
3. Remove the oldest storage checkpoint first.

It is within the scope of the invention that these safeguards can be specified as part of a backup policy used to manage storage checkpoints.

Removal of a storage checkpoint can cause a catalog of persistent frozen images to become incorrect. For example, if during a backup, an application automatically removes a storage checkpoint when a maximum number of checkpoints is attained, but does not update the catalog, the catalog will retain the entry for the removed storage checkpoint persistent frozen image. In addition, if the maximum number of checkpoints is lowered, catalog entries may remain for checkpoints that are removed until another storage checkpoint is made. Users may delete checkpoints manually, or an application can remove checkpoints when the file system runs out of space. For these reasons, a preferred embodiment includes an image correlation module that updates the catalog to capture such changes.

If only a relatively small portion of a database or file system changes on a daily basis, restoration of data from snapshot persistent frozen images can require an unacceptable amount of time. As mentioned above, storage checkpoints track data blocks modified since the last checkpoint was taken. A restoration module can leverage this capability by restoring only changed blocks, not the entire file system or database.

Because storage checkpoints are updated to identify changed data blocks in real time, a block level restoration does not need to search the entire database or file system for the modified blocks. Block level restoration saves time and significantly reduces CPU and network overhead during backups.

In one embodiment, backup policies can be configured to use pre-allocated disk volumes as a data protection medium. For example, a number of disk volumes can be designated to be logically rotated to store multiple versions of primary data in accordance with a rotation schedule.

Figure 3:
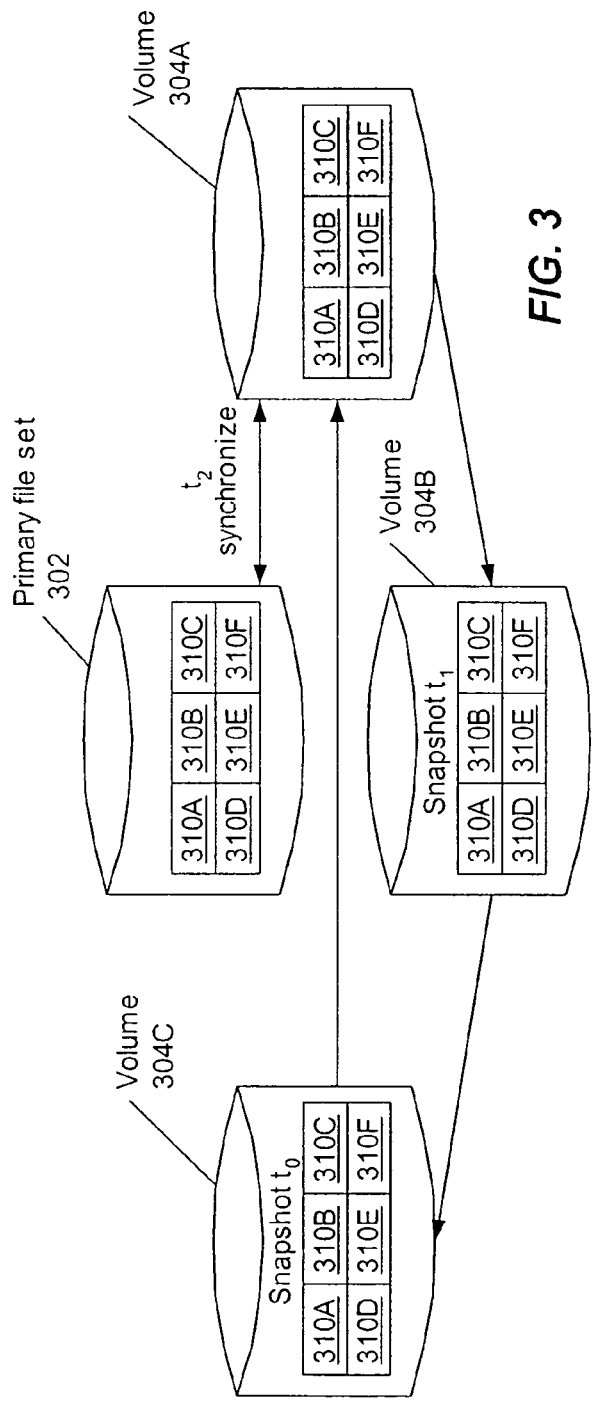
FIG. 3 shows logical volume rotation for snapshots.

FIG. 3 shows the logical rotation of disk volumes for storing snapshot persistent frozen images, assuming three pre-allocated disk volumes, volumes 304A, 304B and 304C. Primary file set 302 is being synchronized with one of the disk volumes, currently volume 304A, to produce a snapshot identical to the primary data. Assuming that the current time is time $t_2$, volume 304B includes a snapshot made at time $t_1$ and volume 304C includes a snapshot made at time $t_0$.

When a logical rotation is made, the volume storing the oldest snapshot of the data is synchronized with primary file set 302 and then detached to produce a snapshot. In this instance, volume 304A would be detached and placed into the rotation schedule as the last disk volume to again be synchronized with the primary data. The next volume in the rotation schedule, here volume 304C, will be the next volume to be synchronized with primary file set 302, and volume 304B will be synchronized after a second rotation.

Figure 4:
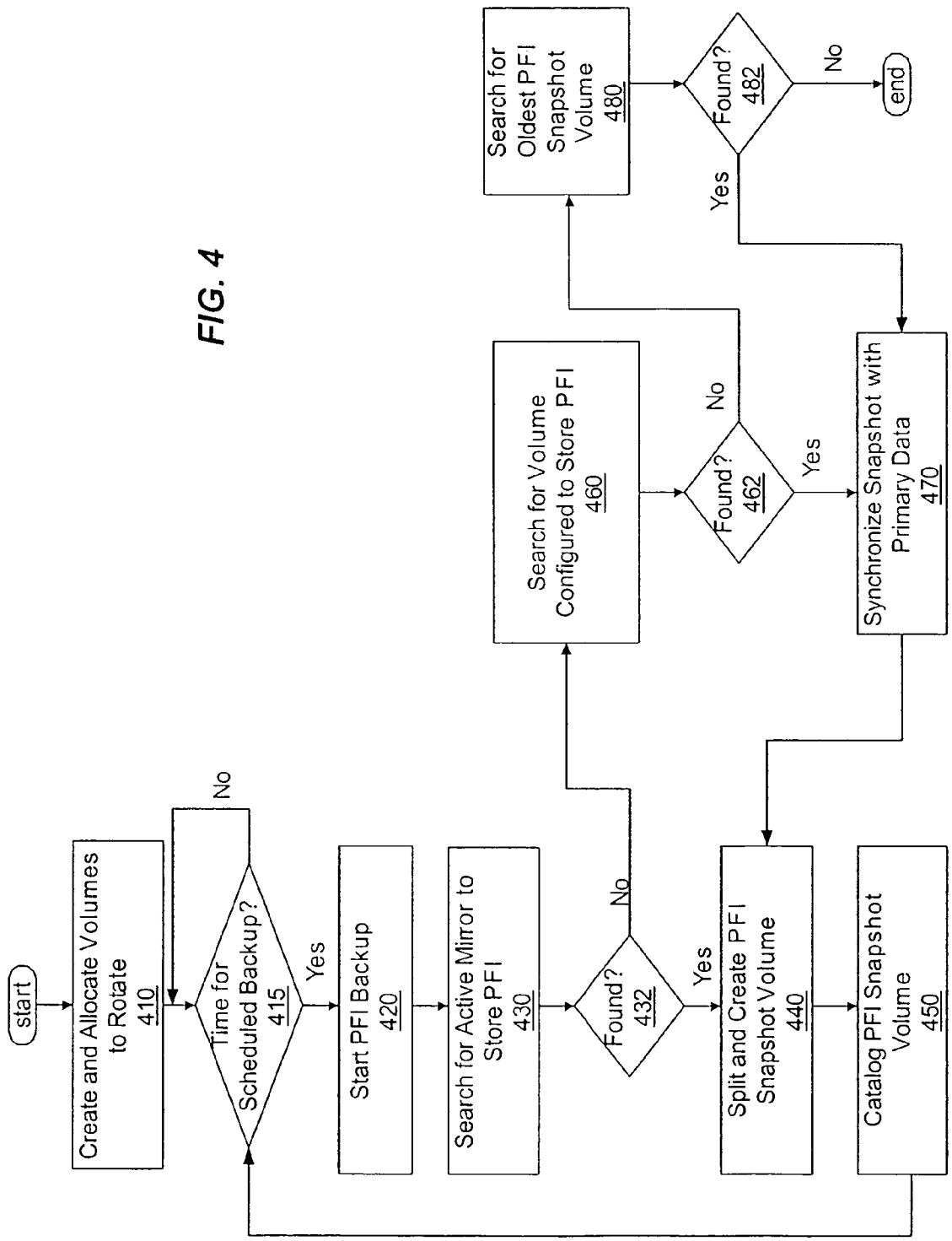
FIG. 4 is a flowchart of a volume rotation algorithm.

FIG. 4 illustrates the volume rotation algorithm used in one embodiment of the invention. In "Create and Allocate Volumes to Rotate" step 410, multiple volumes are created and allocated to serve as mirrors for primary data. At "Time for Scheduled Backup" decision point 415, a determination is made whether the backup schedule includes the current time to create persistent frozen images. If no backup is scheduled for the current time, control returns to "Time for Scheduled Backup" decision point 415 to cycle until the time arrives to create persistent frozen images. If a backup is scheduled for the current time, control proceeds to "Start PFI Backup" step 420.

In "Start PFI Backup" step 420, a persistent frozen image backup is started. In "Search for Active Mirror to Store PFI" step 430, the volumes created and allocated in "Create and Allocate Volumes to Rotate" step 410 and currently serving as active mirrors are searched to determine whether one of the allocated volumes can be used to generate the newly-created persistent frozen image.

Control proceeds to "Found" decision point 432, where a determination is made whether one of the active mirrors can be used to generate the persistent frozen image. If one of the active mirrors cannot be used to generate the persistent frozen image, control proceeds to "Search for Volume Designated as Configured to Store PFI" step 460. In this step, the search is broadened beyond the active mirrors to include volumes not currently serving as active mirrors but that are designated as configured to store persistent frozen images. For example, one of the volumes previously allocated to serve as a mirror may have been detached and is not being actively updated. If at "Found" decision point 432, one of the allocated volumes can store the persistent frozen image, control proceeds to "Split and Create PFI Snapshot Volume" step 440.

From "Search for Volume Designated as Configured to Store PFI" step 460, control proceeds to "Found" decision point 462. If a configured volume is found, control proceeds to "Synchronize Snapshot with Primary Data" step 470. If a configured volume is not found, control proceeds to "Search for Oldest PFI Snapshot Volume" step 480.

In "Search for Oldest PFI Snapshot Volume" step 480, neither an active mirror nor a configured volume was found to generate the persistent frozen image. The algorithm then searches for an existing persistent frozen image snapshot volume to be reused. In this embodiment, the frozen image snapshot volume selected is the oldest persistent frozen image snapshot volume. Control proceeds to "Found" decision point 482. If the oldest persistent frozen image snapshot was found, control proceeds to "Synchronize Snapshot with Primary Data" step 470. If no oldest persistent frozen image snapshot was found, the mirror rotation algorithm ends unsuccessfully.

"Synchronize Snapshot with Primary Data" step 470 includes performing a synchronization of the snapshot with the primary data to create a new snapshot identical to the primary data. In one embodiment, this synchronization process takes advantage of very fast synchronization algorithms provided by a volume management system. Control then proceeds to "Split and Create PFI Snapshot Volume" step 440.

In "Split and Create PFI Snapshot Volume" step 440, the snapshot on the found volume is synchronized with the primary data. The found volume is again split, or detached, to create a snapshot. Control proceeds to "Catalog PFI Snapshot Volume" step 450, where the persistent frozen image is cataloged. Cataloging the persistent frozen image is described in further detail with reference to FIG. 6 below.

Control proceeds from "Catalog PFI Snapshot Volume" step 450 back to "Start PFI Backup" step 420, where another persistent frozen image backup is initiated.

Similar to image correlation for PFI storage checkpoints, catalog adjustments can be made when inconsistencies are found between the catalog and PFI snapshots; however, image correlation with respect to a snapshot does not recover the disk space occupied by the persistent frozen image. As indicated above, volumes for PFI snapshots are pre-allocated and reused, making recovery of disk space unnecessary.

The following sections describe the backup of primary data to persistent frozen images, both as storage checkpoints and as snapshots, and the restoration of data from persistent frozen images.

Backup to a Persistent Frozen Image

Figure 5:
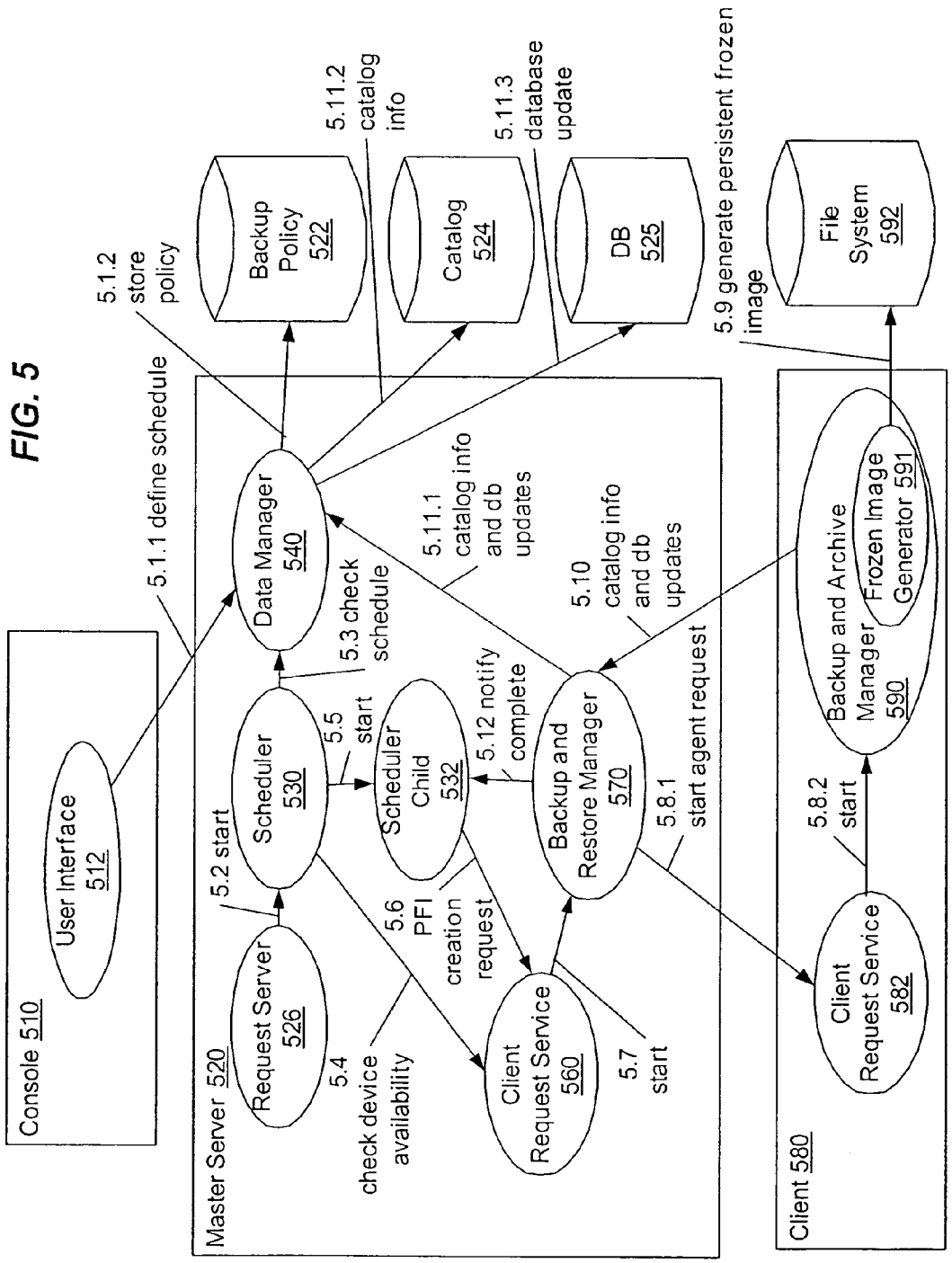
FIG. 5 is a diagram showing generating a frozen image in accordance with one embodiment of the invention.

FIG. 5 shows an example implementation of a system for performing backups to persistent frozen images. A console 510 includes a user interface 512 for an administrator to manage persistent frozen images. Schedules for generating persistent frozen images can be defined by the administrator using user interface 512.

Master server 520 implements the backup policy, such as backup policy 522, and controls the process of creating persistent frozen images for clients such as client 580. These clients, such as client 580, may actually perform a server role with regard to hosting other applications and/or data, but client 580 is a client of master server 520 with regard to creation of a persistent frozen image.

One of ordinary skill in the art will recognize that communication between master server 520 and client 580 can occur via a network. It is within the scope of knowledge of a person of ordinary skill in the art that numerous protocols can be used to pass information between processes running on master server 520 and client 580, or, alternatively, to build a proprietary protocol to accomplish this inter-process communication.

Master server 520 manages storage areas on one or more storage devices storing backup policy 522, catalog 524 and data in database 525. Backup policy 522 and catalog 524 are shown as being stored on separate storage devices from database 525, although backup policy 522, catalog 524 and database 525 can be stored on a single storage device. Furthermore, the information stored in backup policy 522 and catalog 524 can be stored within database 525 or in another type of file.

Schedules for performing backups, including creation of persistent frozen images, are defined by an administrator, as shown in action 5.1.1. Backup schedules can be processed by data manager 540 and stored in the backup management system configuration as part of a backup policy 522, as shown in action 5.1.2. Backup policy 522 can also define clients and file systems that are to be included in the backups, such as client 580 and file system 592, which is managed by client 580.

Once the schedules are defined, a scheduler, such as scheduler 530 on master server 520, uses the schedules to implement backup policy 522. Request server 526 periodically starts scheduler 530, as shown in action 5.2, to check with data manager 540 whether any operations are scheduled, as shown in action 5.3. When a backup policy, such as backup policy 522, indicates that a PFI backup is scheduled, scheduler 530 determines whether a storage area is configured to receive the persistent frozen image. Scheduler 530 collects this availability information from a service in communication with clients managing storage areas, such as client request service 560, as shown in action 5.4.

In one embodiment, disk volumes can be marked during configuration, for example, with indicators designating that the volume is configured for storing persistent frozen images. Such indicators can be quickly used by client service request 560 to determine whether a volume is available. For example, the name of the volume can include a string identifying that the volume is configured to store persistent frozen images.

As shown in action 5.5, scheduler 530 can start a scheduler child process, such as scheduler child process 532, to manage the generation of a particular persistent frozen image. In the example described herein, scheduler child process 532 manages the creation of the particular persistent frozen image described. In action 5.6, scheduler child process 532 sends the persistent frozen image creation request to the appropriate client request service, such as client request service 560, for the respective client. In this example, the persistent frozen image is to be managed by a frozen image generator running 591 running on client 580.

Client request server 560 on master server 520 starts a backup and restore manager 570 to manage creation of the persistent frozen image of interest, as shown in action 5.7. Backup and restore manager 570 requests client request service 582 on client 580 to start an appropriate agent on the client, such as backup and archive manager 590, as shown in action 5.8.1. In action 5.8.2, client request service 582 starts backup and archive manager 590.

Backup and archive manager 590 causes a persistent frozen image to be generated. Causing a persistent frozen image to be generated can include requesting a frozen image generator module to generate the frozen image. The frozen image generator module can reside within backup and archive manager 590, as does frozen image generator module 591. Alternatively, the frozen image generator module can reside on client 580, for example, as a separate software module, or the frozen image generator module can be part of a client device, such as a checkpoint or snapshot generator within a storage array.

In one embodiment, the frozen image is generated in free space for file system 592 associated with client 580, as shown in action 5.9. In other embodiments, the frozen image is generated on a separate disk volume. The disk volume storing the frozen image can be marked as a volume storing persistent frozen images. The mark is used during synchronization to quickly identify volumes storing persistent frozen images.

Backup and archive manager 590 produces corresponding catalog and database information for the persistent frozen image generated. Backup and restore manager 570 collects catalog and database information from backup and archive manager 590 in action 5.10 and sends corresponding catalog and database updates to the data manager 540 on master server 520, as shown in action 5.11.1.

When backup and archive manager 590 completes creation of persistent frozen images, backup and restore manager 570 commits the catalog entry for the persistent frozen image to the catalog via data manager 540, as shown in action 5.11.2. Database changes are also committed to database 525, as shown in action 5.11.3. Backup and restore manager 570 notifies scheduler child process 550 that the creation of the persistent frozen image is complete in action 5.12. Unless other backup jobs are active or ready to run, processes associated with the creation of this particular persistent frozen image are ended.

Figure 6A:
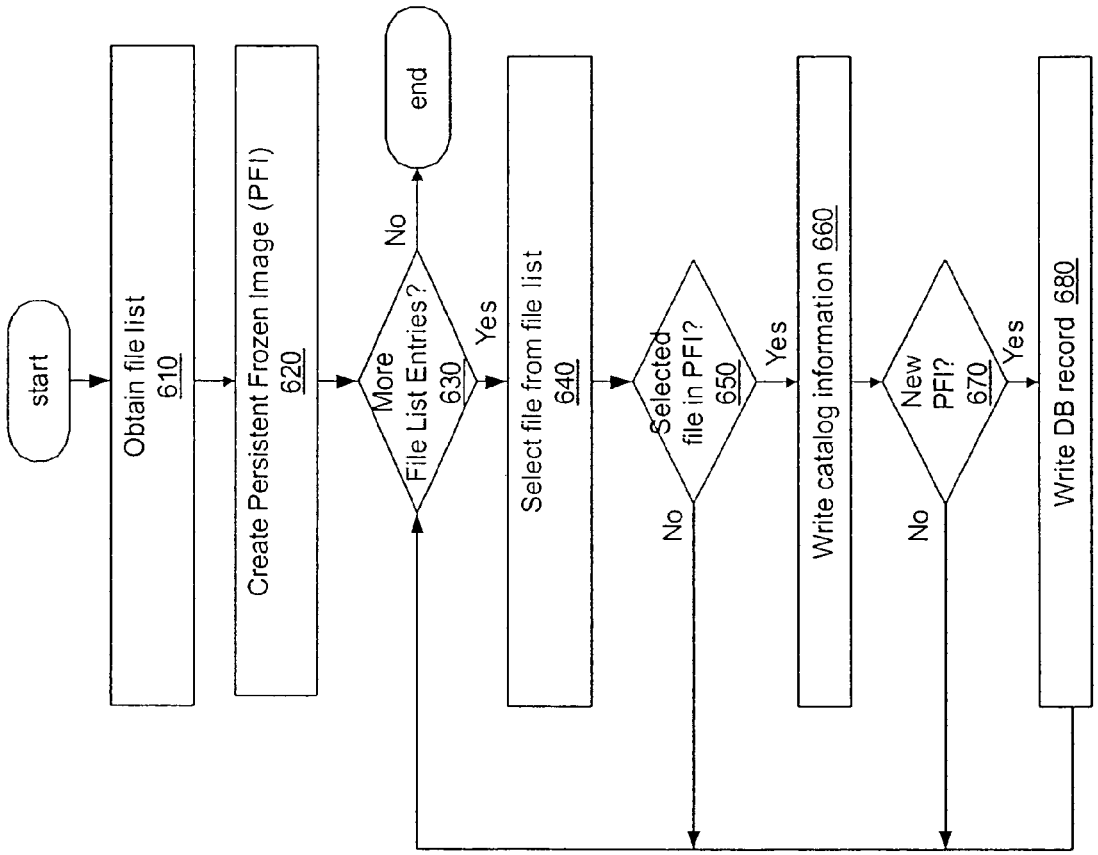
FIG. 6A is a flowchart of the actions taken by the backup and archive manager of FIG. 5 in generating the frozen image.

FIG. 6A shows actions taken by backup and archive manager 590 in generating a persistent frozen image. In "Obtain File List" step 610, backup and archive manager 590 obtains a list of files to be backed up from backup and restore manager 570. This list of files can be obtained from a schedule for generating frozen images.

In "Create Persistent Frozen Image" step 620, the persistent frozen image is created. An example of one implementation of "Create Persistent Frozen Image" step 620 is described next with regard to FIG. 6B.

Figure 6B:
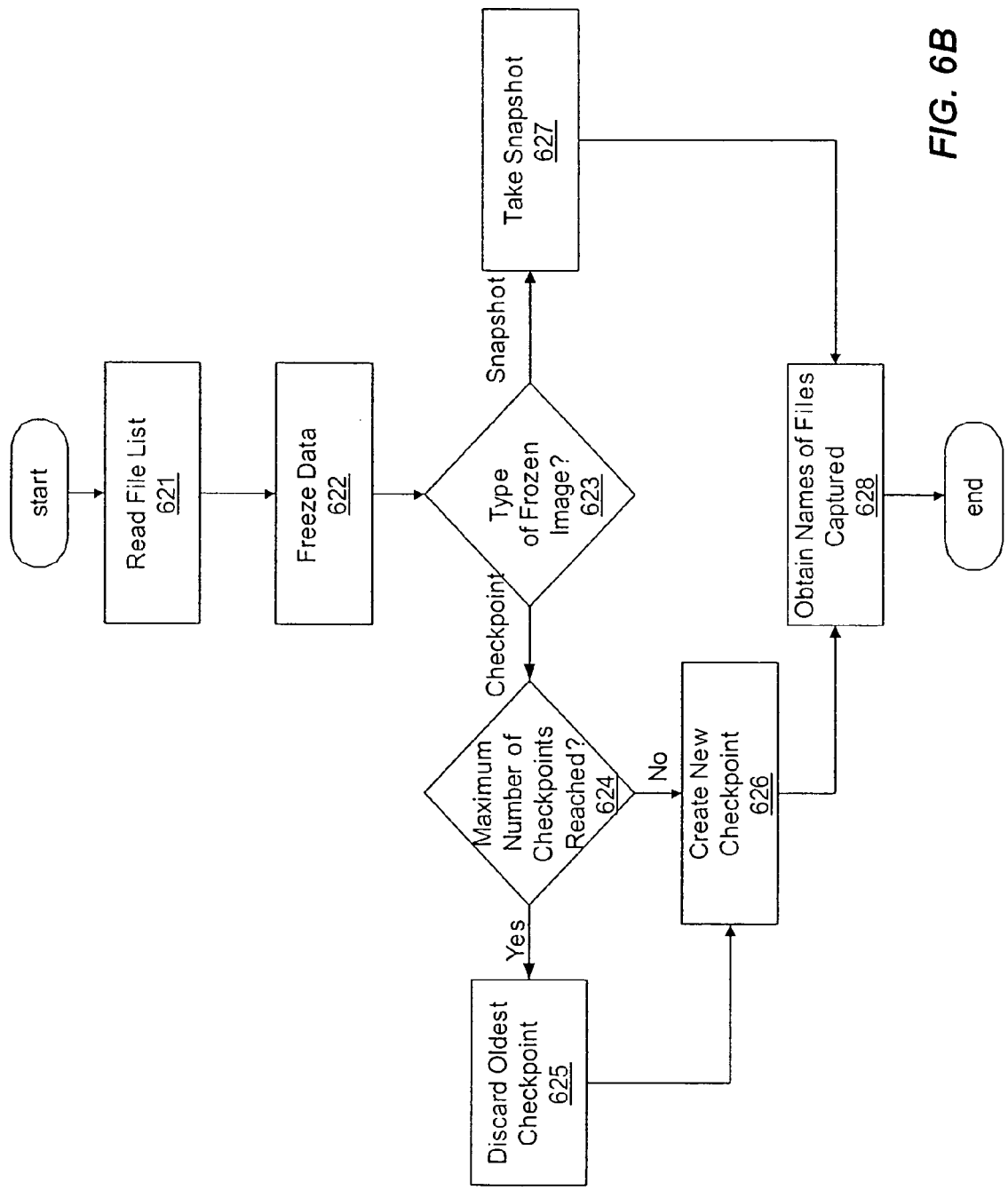
FIG. 6B is a flowchart of the Create Persistent Frozen Image step of the flowchart of FIG. 6A.

Referring to FIG. 6B, in "Read File List" step 621, backup and archive manager 590 reads the list of files it obtained from backup and restore manager 570 in "Obtain File List" step 610 of FIG. 6A. The file list may include files that are available from different persistent frozen images, and these persistent frozen images will typically include numerous files not on the file list.

Control then proceeds to "Freeze Data" step 622. Freezing the persistent frozen image typically involves freezing the entire file system and/or database system for a very short time period until transactions in progress are complete and a persistent frozen image can be captured. As described above, persistent frozen images can be captured, for example, in the form of storage checkpoints and/or snapshots. These storage checkpoints and/or snapshots can typically be captured very quickly using backup procedures provided by backup management systems. In one embodiment, the entire file system and/or database system is captured as part of the persistent frozen image.

Control then proceeds to "Type of Frozen Image" decision point 623. If the frozen image is a storage checkpoint, control proceeds to "Maximum Number of Checkpoints Reached" decision point 624. If a maximum number of storage checkpoints specified in a backup policy has been reached, control proceeds to "Discard Oldest Checkpoint" step 625. The oldest storage checkpoint is discarded, as described with reference to FIG. 2. Control then proceeds to "Create New Checkpoint" step 626. If a maximum number of storage checkpoints has not been reached, control proceeds directly from "Type of Frozen Image" decision point 623 to "Create New Checkpoint" step 626.

As mentioned earlier, causing a persistent frozen image to be generated can include requesting a frozen image generator to generate the checkpoint. The frozen image generator can reside within backup and archive manager 590; the frozen image generator can reside on client 580, for example, as a separate software module; or the frozen image generator can be part of a client device, such as a frozen image generator for checkpoints within a storage array.

Control then proceeds from "Create New Checkpoint" step 626 to "Obtain Names of Files Captured" step 628, which is described in further detail below.

If in "Type of Frozen Image" decision point 623, the frozen image is a snapshot, control proceeds to "Take Snapshot" step 627. A storage area on one or more pre-allocated disk volumes is identified for the frozen image. If the frozen image services module uses a volume rotation algorithm as described with respect to FIG. 4, an algorithm such as the one shown in FIG. 4 is used to identify the disk volume. The disk volume is split and a new snapshot is created by a frozen image generator for snapshots. Control then proceeds to "Obtain Names of Files Captured" step 628.

In "Obtain Names of Files Captured" step 628, names of the files captured in the frozen image are obtained. In one embodiment, these names are obtained by mounting the storage device upon which the persistent frozen image was captured. Namespaces on the storage device, here one or more disk volumes, are read to obtain information about the files that were captured. After the namespace information is captured, the storage device is dismounted.

At "More File List Entries" decision point 530, a determination is made whether additional files that have not already been cataloged are included in the file list. If not, backup and archive manager 590 notifies the backup and restore manager that the persistent frozen image creation is complete. If a file remains on the file list to be processed, control proceeds to "Select File from File List" step 640, where a file is selected from the file list. Control proceeds to "Selected File in PFI" decision point 650, where a determination is made whether the file was included in the list of files created for the persistent frozen image created in "Create Persistent Frozen Image" step 620. If the selected file is not in the persistent frozen image, control returns to "More File List Entries" decision point 630 to determine whether files in the file list have not yet been processed.

If the selected file is in the persistent frozen image, control proceeds to "Write Catalog Information" step 660. In "Write Catalog Information" step 660, path information for the file is written from the namespace information captured for the persistent frozen image. In the embodiment shown, the catalog itself corresponds to a file created for the persistent frozen image in a common catalog directory for other types of backups. The file contains the paths of the files that are backed up as part of that particular persistent frozen image. Therefore, making a catalog entry includes writing the path information for a particular file into the catalog file.

In one embodiment, one logical block namespace is used to store names of files corresponding to each persistent frozen image. Information about physical hardware locations for the file is not stored in the logical block namespace because only an identifier for the file and an identifier for the persistent frozen image in which the file is stored are needed to retrieve the file.

Control proceeds from "Write Catalog Information" step 660 to "New PFI" decision point 670 to determine whether the persistent frozen image has already been recorded in the database. For example, a database entry for the persistent frozen image may have been recorded while processing a previous file in the file list, and there is no need to record the database entry again. A database entry is made to record information necessary to subsequently restore the persistent frozen image. For example, the database entry can include information such as a file system type, a file system path, a method and a version of the method to be used to perform the restoration, and a name of the persistent frozen image.

The catalog entry and the database entry together provide information for how to access the persistent frozen image and the names of files included in each persistent frozen image. The catalog entry and database entry correspond to information gathered by catalog systems that are used for other types of backups. One of ordinary skill in the art will recognize that the catalog entry may itself be implemented in a database or other type of file system, and that the database entry including restoration information could be maintained in another type of file. Furthermore, a single entry can be made capturing both the catalog information and the restoration information described above as part of the database entry.

If in "New PFI" decision point 670, the PFI is not new, control returns to "More File List Entries" decision point 630 to determine whether files in the file list have not yet been processed.

If in "New PFI" decision point 670, the PFI is new, control proceeds to "Write DB Record" step 680, where a database entry is made for the persistent frozen image. Control returns to "More File List Entries" decision point 630 to determine whether files in the file list have not yet been processed.

Writing the database entry and the catalog entry prepares the persistent frozen images for the restoration of primary data and/or the synchronization of persistent frozen images with primary data. The restoration of persistent frozen images is described in the following description of FIG. 7.

Restoring from a Persistent Frozen Image

Figure 7:
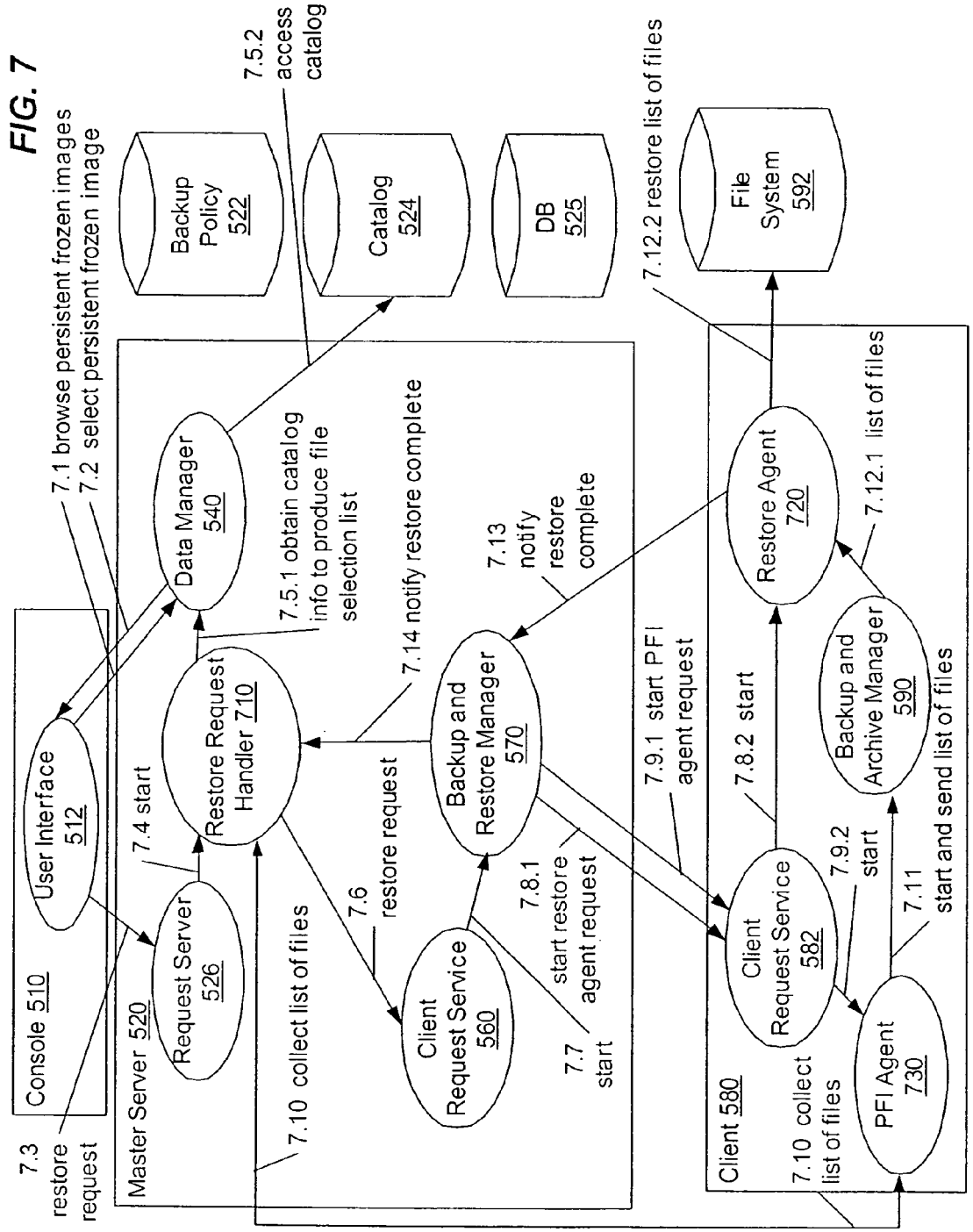
FIG. 7 is a flowchart of restoring data from a frozen image in the embodiment of the invention shown in FIGS. 5, 6A and 6B.

FIG. 7 shows restoration of data from the persistent frozen image of file system 592 created as illustrated in FIG. 5. Restore operations are typically administrator-directed. An administrator uses a user interface, such as user interface 512 of console 510, to access data manager 540 to browse available persistent frozen images from which to restore, as shown in action 7.1. These persistent frozen images are cataloged in catalog 524, as described above. The user can select a persistent frozen image from catalog 524 to restore, as shown in action 7.2.

After selecting the persistent frozen image to restore, in action 7.3, the user submits a restore request. In action 7.4, request server 526 starts a restore request handler 710 on master server 520 to manage the restoration process. Restore request handler 710 uses catalog 524 information obtained in action 7.5 to produce a detailed file selection list, identifying respective files to be restored from respective persistent frozen images. For each persistent frozen image, restore request handler 710 sends a restore request to the client request service, such as client request service 560, for the respective client, here client 580, as shown in action 7.6. In this case, client 580 corresponds to a server for the persistent frozen image selected.

Client request service 560 on master server 520 starts a backup and restore manager 570 in action 7.7 to process the restore request. Backup and restore manager 570 uses client request service 582 in action 7.8.1 to start a restore agent 720 on client 580 in action 7.8.2. Backup and restore manager 570 also uses client request service 582 in action 7.9.1 to start a persistent frozen image (PFI) restore agent 730 in action 7.9.2.

In action 7.10, PFI agent 730 connects back to restore request handler 710 on master server 520 to collect the list of files to be restored from the persistent frozen image(s) selected. PFI agent 730 also connects to restore agent 720 on client 580 to pass the connection information, such as a handle, to a backup agent. PFI agent 730 starts backup and archive manager 590 in action 7.11 and sends backup and archive manager 590 the list of files to be restored.

Restore agent 720 begins consuming the data stream generated by backup and archive manager 590 when processing the list of files, as shown in action 7.12.1. Restore agent 720 restores the contents of files on the list of files to be restored. When restore agent 720 completes the restore, restore agent 720 notifies backup and restore manager 570 of the completion, as shown in action 7.13. Backup and restore manager 570, in turn, notifies restore request handler 710 in action 7.14, and all processes associated with the restoration of the data from the persistent frozen image are ended.

Restoring data from persistent frozen images differs from "traditional" restoration from tape storage. Persistent frozen image restoration uses the backup and archive manager used for backups to perform a "reverse backup" of the requested files. In a traditional restoration of data from backup, a media manager is used to send a data stream to an archive manager for file restoration. With persistent frozen image restoration, the backup and archive manager reads data from the frozen image on the client and restores the data on a device for the client, without sending the data elsewhere.

The following sections describe examples of the basic operations involved in creating storage checkpoints and snapshots. The present invention is designed to work with capabilities of existing backup management systems to produce backups, such as storage checkpoints and/or snapshots. The invention is not limited to any particular implementation to generate backups, and the examples provided in FIGS. 8 through 10 are provided as illustrations only.

Storage Checkpoints

In one embodiment, a persistent frozen image services module creates and maintains a number of versions of data as storage checkpoints. In some embodiments, the number of versions of the data can be configured by an administrator. The time required to create storage checkpoints is proportional to the number of files and directories in the file system associated with the storage checkpoint.

FIG. 8 shows primary file set 810 including database 812 and an associated storage checkpoint 820. Database 812 is shown as an example of a file set, although the invention can also be used for other types of file systems and files. Database 812 includes an emp.db namespace component 814 and ajun.dbf namespace component 816. As shown by arrow 817, data blocks 818A through 818E are stored within primary file set 810.

In this example, storage checkpoint 820 is logically identical to the primary file set 810 when storage checkpoint 820 is created, but storage checkpoint 820 does not contain actual data blocks. Storage checkpoint 820 includes database 822 having emp.db namespace component 824 and jun.dbf namespace component 826. Rather than containing a copy of the actual data, however, storage checkpoint 820 includes a pointer 827 to the primary file set 810 data. One of skill in the art will recognize that pointer 827 may be implemented as an array of pointers to individual data blocks within primary file set 810 or as a single pointer to a list of pointers to data blocks. Storage checkpoint 820 is created within the free space available to primary file set 810, and thereby minimizes the use of storage space. The following example describes creation of a storage checkpoint in further detail.

Figure 9A:
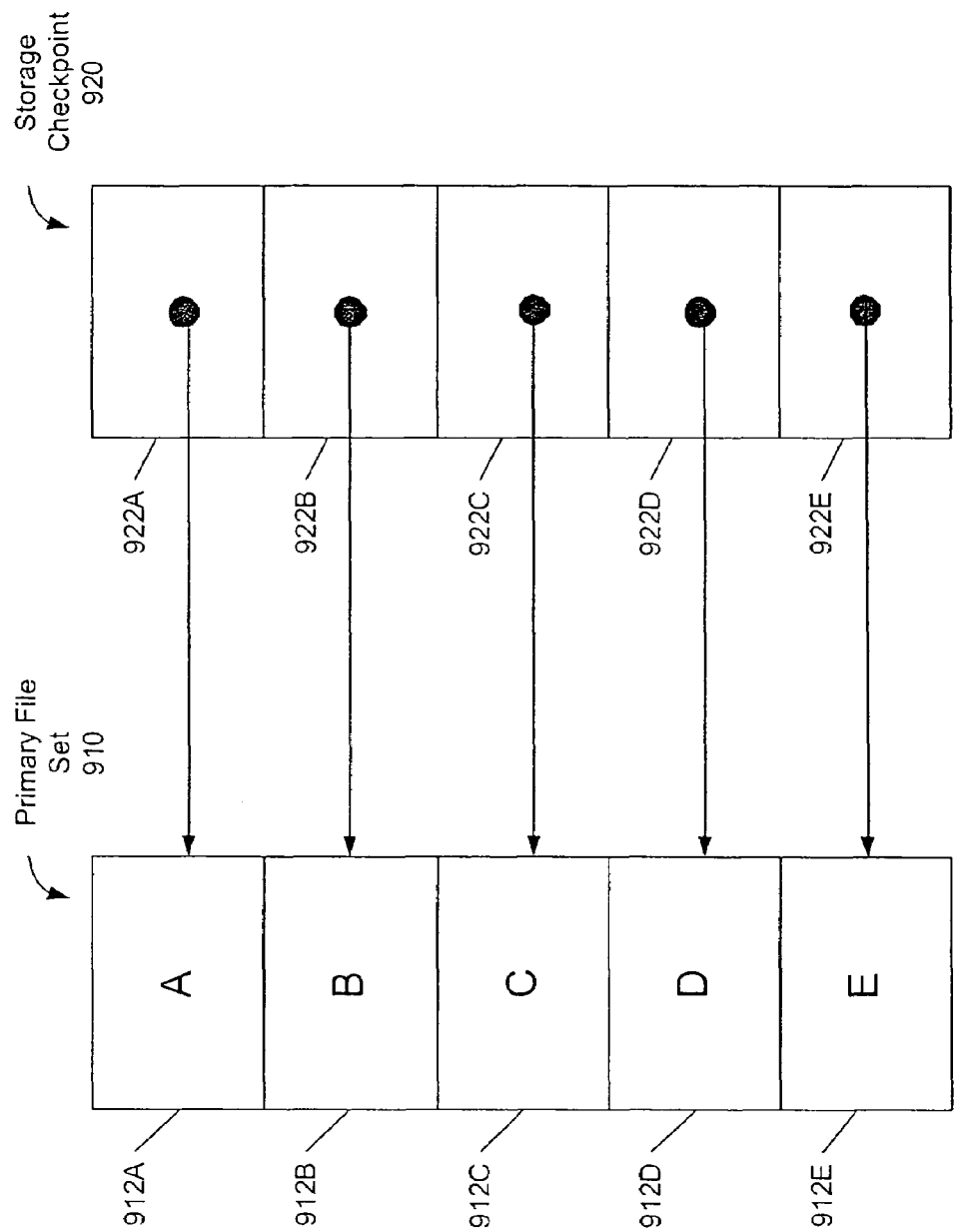
FIG. 9A shows initialization of a storage checkpoint.

In FIG. 9A, each data block of a primary file set 910 is represented by one of blocks 912A, 912B, 912C, 912D or 912E. FIG. 9A shows a storage checkpoint 920, with each block 922A through 922E containing a pointer to a corresponding block 912A through 912E in primary file set 910. Storage checkpoint 920 represents the state of the data at the time the storage checkpoint 920 is taken.

Figure 9B:
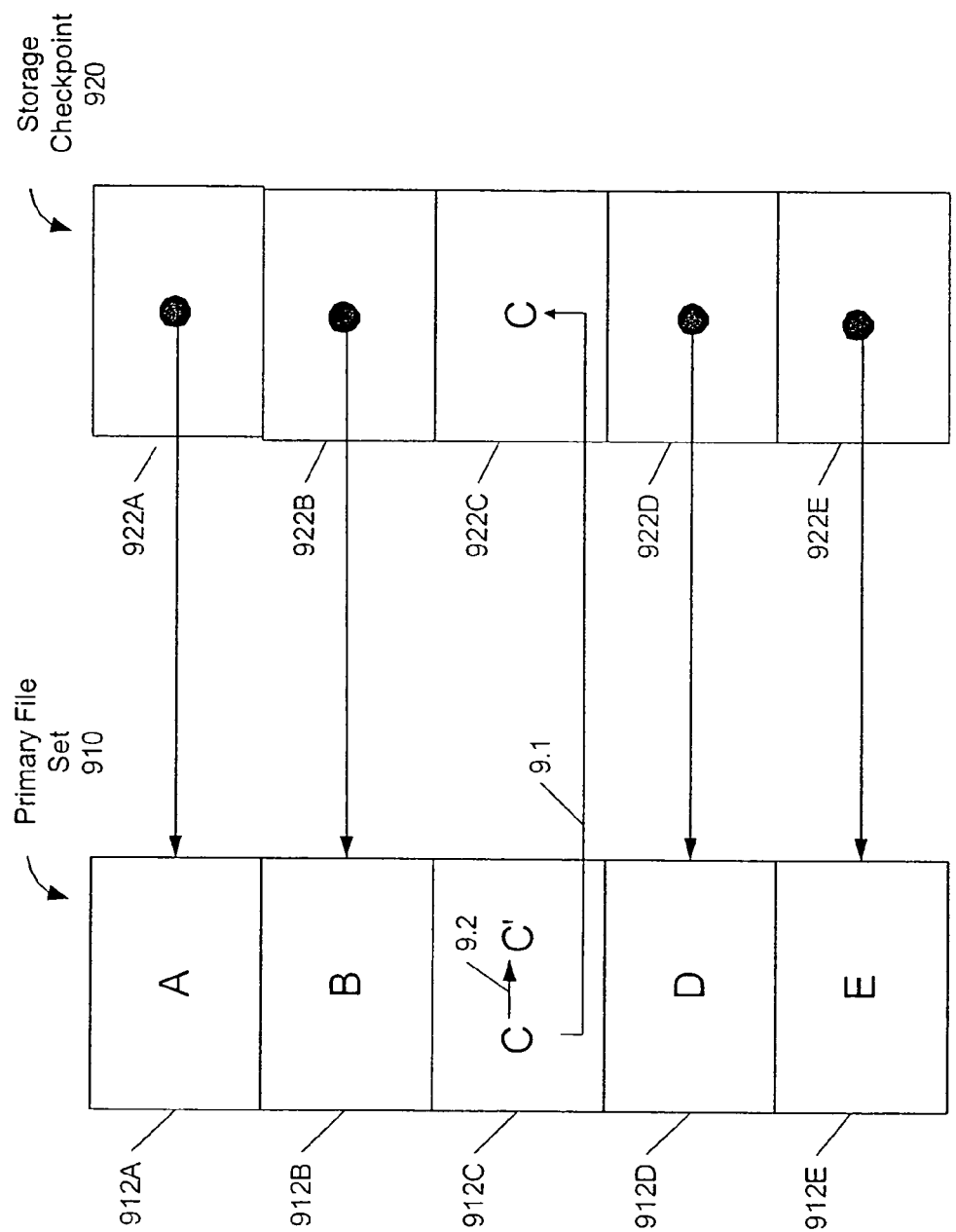
FIG. 9B shows the relationship between a primary file set and an associated storage checkpoint when an update is made to the primary file set.

In FIG. 9B, block 912C is updated, having originally containing a value of "C." Before block 912C is updated with new data having a value of "C'", the original data having a value of "C" is copied to the storage checkpoint 920 block 922C, as shown in action 9.1. Block 912C is then updated with the new value of "C'", as shown in action 9.2. This technique is called the copy-on-write technique, which allows the storage checkpoint 920 to preserve the information necessary to reconstruct the image of the primary file set 910 at the point in time when storage checkpoint 920 is taken.

Every update or write operation does not necessarily result in copying data to the storage checkpoint. In this example, subsequent updates to block 912C, now containing "C'," are not copied to storage checkpoint 920 because the original image of block 912C containing a value of "C" is already saved.

Combining the unchanged data of primary file set 910 with the changed data of the corresponding storage checkpoint 920 enables an exact image of the corresponding primary file set (here primary file set 910), as of the point in time when the checkpoint was made, to be recovered.

A storage checkpoint enables reconstruction of a complete image of the file system as the file system appeared at the time the storage checkpoint is created. The storage checkpoint contains the file system metadata and file data blocks. A storage checkpoint can be mounted, accessed, and written just as a file system can be mounted, accessed and written. Storage checkpoints are useful for backup applications that require a consistent and stable image of an active file system. Storage checkpoints introduce some overhead to the system and to the application performing the write operation.

To improve performance, the life of data storage checkpoints can be limited to reduce storage space required for backups of production data. For example, if the primary file set is volatile, storage checkpoints may grow very large as the number of data blocks changed grows large. By scheduling creation of storage checkpoints more often, and therefore limiting the life of existing storage checkpoints, the storage space required to maintain backups of production data can be controlled.

Creation of a storage checkpoint freezes the primary file set, initializes the storage checkpoint, and restarts input/output on the file system. Specifically, the file system is first brought to a stable state where all of the data in the file system is written to disk. The freezing process that follows momentarily blocks all input/output operations to the file system. A storage checkpoint is then created without any actual data. Input/output operations to the file system are restarted, also referred to as "thawing" the file system. A similar process is used to create storage checkpoints of databases, and a storage checkpoint can be taken of a database that is either online or offline.

Storage checkpoints provide a form of persistent frozen images that are quick to back up and that require minimal storage space. An alternative form for storing persistent frozen images as snapshots is described below.

Snapshots

As mentioned previously, unlike a storage checkpoint, a snapshot is a complete copy of data. The snapshot is taken of data in a primary or source storage area on one or more primary or source storage devices and in one or more secondary storage devices that are preferably physically independent of the source storage devices and at least equal in size to the primary storage area. It is not necessary that all data in a particular storage area or device, such as a particular disk volume, be copied to a snapshot. The invention applies to any subset of data in one or more storage areas of which a snapshot is made, including, for example, a file, file set, or database.

As in creating a storage checkpoint, in creating a snapshot, transactions are allowed to finish and new input and output in the primary storage area is briefly halted while the snapshot is made.

In FIG. 10A, two mirrors of data 1010 are maintained, and corresponding updates are made to mirrors 1020A and 1020B when an update, such as update 1004A, is made to data 1010. For example, update 1004B is made to mirror 1020A residing on mirror data storage area 1022, and corresponding update 1004C is made to mirror 1020B residing on mirror data storage area 1024 when update 1004A is made to data 1010. As mentioned earlier, each mirror should reside on a separate physical storage device from the data for which the mirror serves as a backup, and therefore, data storage areas 1012, 1022, and 1024 correspond to three physical storage devices in this example.

A snapshot of data can be made by "detaching," or "splitting," a mirror of the data so that the mirror is no longer being updated. FIG. 10B shows storage environment 1000 after detaching mirror 1020B. Detached mirror (snapshot) 1020B serves as a snapshot of data 1010 as it appeared at the point in time that mirror 1020B was detached. When another update 1006A is made to data 1010, a corresponding update 1006B is made to mirror 1020A. However, no update is made to detached mirror (snapshot) 1020B. Instead, a pointer to the data changed in update 1006A is retained in a data change log 1030, which tracks changes in primary data with respect to detached mirror (snapshot) 1020B.

In one embodiment, resynchronization allows refreshing and re-using snapshots rather than discarding the snapshots. A snapshot such as snapshot 1020B can be quickly re-associated with the original primary data of which it is a copy in a process sometimes referred to as a "snapback." A resynchronization module (not shown) keeps track of the updates to the primary volume while the snapshot has been unavailable for update in data change log 1030. When the snapshot is "reattached" to serve as a mirror, only the updates that were missed are applied to synchronize the snapshot with the primary data. For example, if the storage device storing detached mirror (snapshot) 1020B will be again used to serve as a mirror for production data, an update applying the change made in update 1006A would be applied to snapshot 1020B before other updates are made. A snapshot that is not up to date is sometimes referred to as a "stale mirror."

Benefits of storage checkpoints include the following:

Storage checkpoints consume less storage space because there is no need for secondary storage devices containing complete copies of source data.

Storage checkpoints are easier to configure because storage devices are not allocated exclusively to store storage checkpoints.

Restoration of individual data blocks is easier from storage checkpoints because changed data blocks are already identified.

Benefits of snapshots include the following:

Storage space is pre-allocated so the need for space management is minimized.

Creating snapshots has less impact on the performance of the application or database host being backed up, because the copy-on-write mechanism is not needed.

Creating snapshots allows faster backups because there is no need to share disk input/output and network bandwidth. The backup process reads data from a separate storage device operating independently of the primary storage device that holds the source data.

Snapshots can be used as online protection in case of a hardware failure.

The following section describes a situation in which information in addition to data in the form of a snapshot or storage checkpoint is required to enable restoration of primary data from a persistent frozen image.

Persistent Frozen Images for Oracle Databases

In one embodiment, persistent frozen images can be created for Oracle® databases managed using Oracle® database software produced by Oracle Corporation of Redwood Shores, Calif. The snapshot capabilities of Oracle® software and/or supporting hardware are used to create point-in-time disk copies of file systems or volumes. These point-in-time disk copies are treated as persistent frozen images and cataloged and managed as described above.

However, these point-in-time disk copies do not capture all information that is necessary to successfully restore an Oracle® database; for example, log files and control files are not captured. Oracle® Resource Manager (RMAN) provides a data stream for log files and control files into a data buffer. Information from the data buffer is stored to capture the control and log files information and is related to the persistent frozen image capturing the Oracle® database files. The stored log and control files information is used in conjunction with the persistent frozen image when the Oracle® database is restored. This capability allows business-critical applications to run without extended downtime or degraded performance using non-proprietary and inexpensive hardware.

In one embodiment, Oracle® Recovery Manager (RMAN) scripts are created for persistent frozen image services. An example script to invoke persistent frozen image services for Oracle® is provided below:

```
send 'NB_ORA_PC_BTYPE=PFI, NB_ORA_CLASS=<policy_name>'
Example:
run {
allocate channel t1 type 'SBT_TAPE';
send 'NB_ORA_PC_BTYPE=PFI, NB_ORA_CLASS=daily_ora'
backup proxy format 'df_%s_%p_%t'
tablespace USERS ;
```

Control file and archived log protection are under control of RMAN. An administrator can set up either disk or tape storage unit(s) in an Oracle® class. A standard Oracle® installation calls for these files to be placed on 3 (or more for log files) separate mount points. These disk or tape storage units can then be used by persistent frozen image services to restore Oracle® databases from the persistent frozen images.

Figure 11:
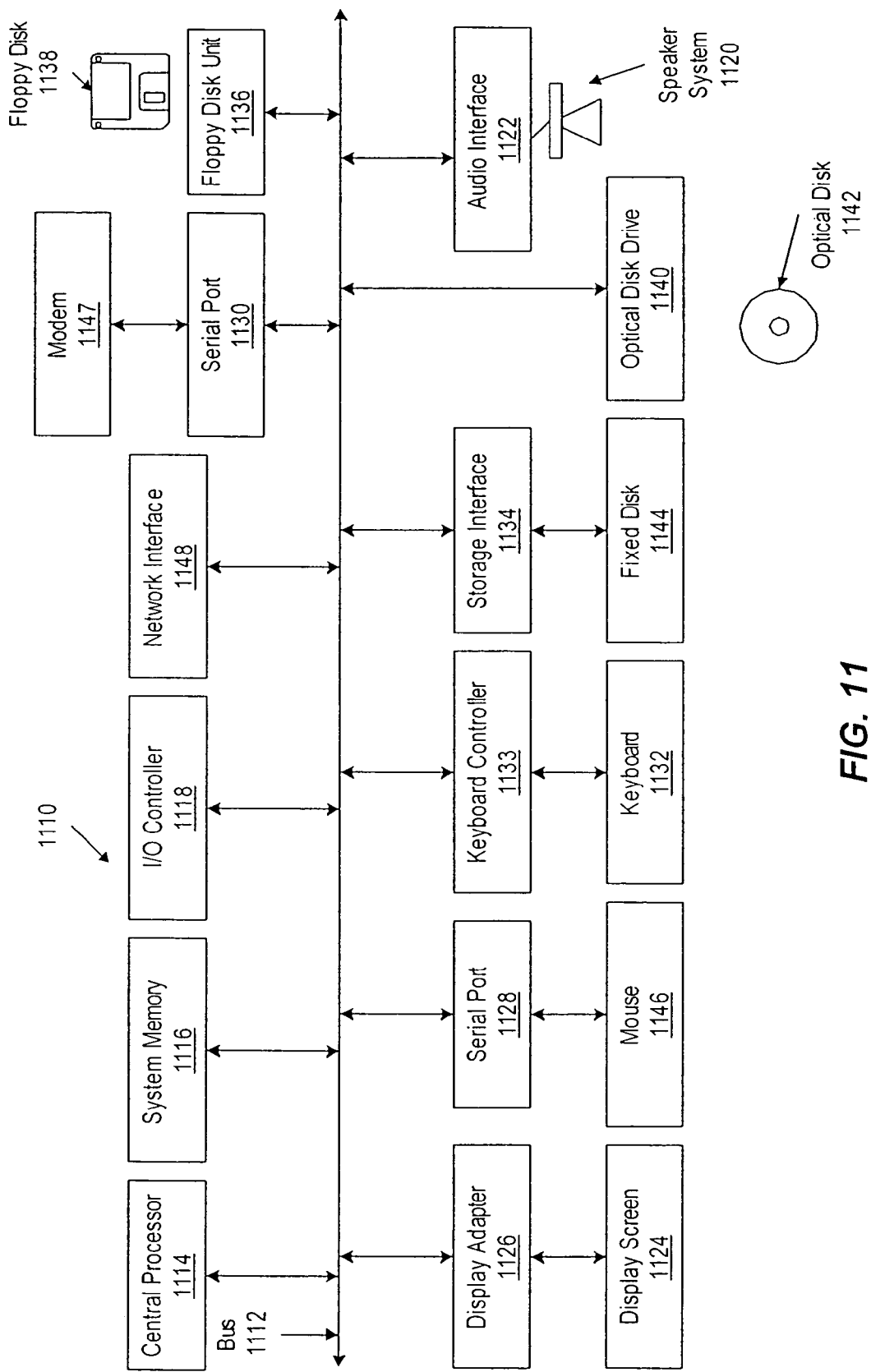
FIG. 11 is a block diagram illustrating a computer system suitable for implementing embodiments of the present invention.

The following sections describe an example computing and network environment suitable for implementing the present invention. An Example Computing and Network Environment FIG. 11 depicts a block diagram of a computer system 1110 suitable for implementing the present invention. Computer system 1110 includes a bus 1112 which interconnects major subsystems of computer system 1110 such as a central processor 1114, a system memory 1116 (typically RAM, but which may also include ROM, flash RAM, or the like), an input/output controller 1118, an external audio device such as a speaker system 1120 via an audio output interface 1122, an external device such as a display screen 1124 via display adapter 1126, serial ports 1128 and 1130, a keyboard 1132 (interfaced with a keyboard controller 1133), a storage interface 1134, a floppy disk drive 1136 operative to receive a floppy disk 1138, and a CD-ROM drive 1140 operative to receive a CD-ROM 1142. Also included are a mouse 1146 (or other point-and-click device, coupled to bus 1112 via serial port 1128), a modem 1147 (coupled to bus 1112 via serial port 1130) and a network interface 1148 (coupled directly to bus 1112).

Bus 1112 allows data communication between central processor 1114 and system memory 1116, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., CD-ROM drive 1140), floppy disk unit 1136 or other storage medium. Additionally, applications may be in the form of electronic signals modulated in accordance with the application and data communication technology when accessed via network modem 1147 or interface 1148.

Storage interface 1134, as with the other storage interfaces of computer system 1110, may connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 11 to be present to practice the present invention. The devices and subsystems may be interconnected in different ways from that shown in FIG. 11. The operation of a computer system such as that shown in FIG. 11 is readily known in the art and is not discussed in detail in this application. Code to implement the present invention may be stored in computer-readable storage media such as one or more of system memory 1116, fixed disk 1144, CD-ROM 1142, or floppy disk 1138. Additionally, computer system 1110 may be any kind of computing device, and so includes personal data assistants (PDAs), network appliance, X-window terminal or other such computing device. The operating system provided on computer system 1110 may be MS-DOS®, MS-WINDOWS®, OS/2®, UNIX®, Linux® or other known operating system. Computer system 1110 also supports a number of Internet access tools, including, for example, an HTTP-compliant web browser having a JavaScript interpreter, such as Netscape Navigator®, Microsoft Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 1110). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 12:
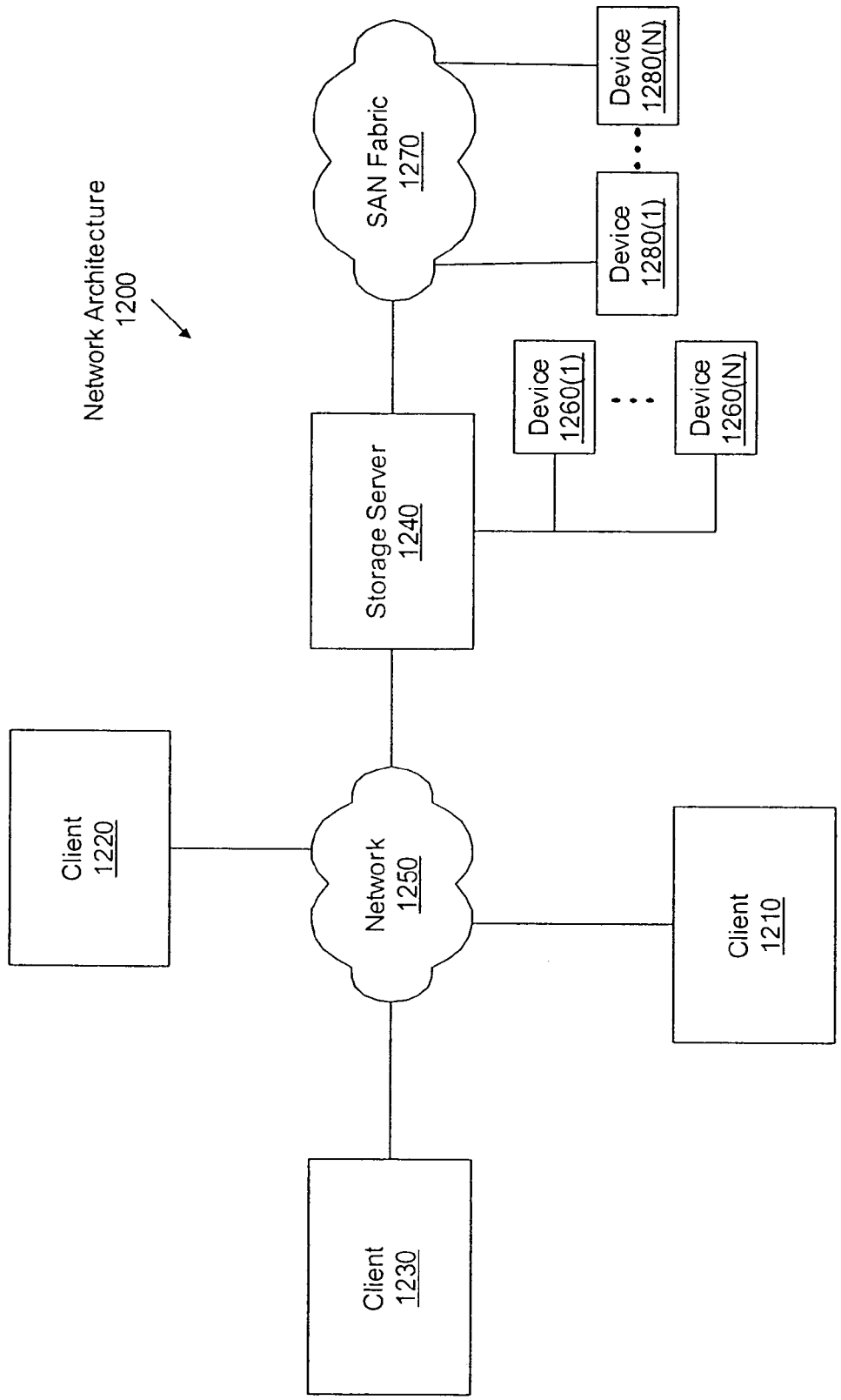
FIG. 12 is a block diagram illustrating a network environment in which management of frozen images in accordance with embodiments of the present invention may be practiced.

FIG. 12 is a block diagram depicting a network architecture 1200 in which client systems 1210, 1220 and 1230, as well as a storage server 1240 (any of which can be implemented using computer system 1110), are coupled to a network 1250. Storage server 1240 is further depicted as having storage devices 1260(1)–(N) directly attached thereto. Storage server 1240 is also connected to a SAN fabric 1270, although connection to a storage area network is not required for operation of the invention. SAN fabric 1270 supports access to storage devices 1280(1)–(N) by storage server 1240, and so by client systems 1210, 1220 and 1230 via network 1250.

With reference to computer system 1110, modem 1147, network interface 1148 or some other method can be used to provide connectivity from computer system 1110 to network 1250. Client systems 1210, 1220 and 1230 are able to access information on storage server 1240 using, for example, a web browser or other client software (not shown). Such a client allows client systems 1210, 1220 and 1230 to access data hosted by storage server 1240 or one of storage devices 1260(1)–(N) or 1280(1)–(N). FIG. 12 depicts the use of a network such as the Internet for exchanging data, but the present invention is not limited to the Internet or any particular network-based environment.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
adding an entry for a frozen image of data in a catalog for tracking a plurality of versions of the data when the frozen image is generated, wherein the plurality of versions of the data comprises:
   a first version of the data corresponding to the frozen image; and
   a second version of the data stored on a sequential access storage device; and
the catalog comprises:
   a first entry corresponding to the frozen image; and
   a second entry corresponding to the second version.

2. The method of claim 1 further comprising:
causing the frozen image to be generated in accordance with a schedule.

3. The method of claim 2 further comprising:
capturing at least one file when the frozen image is generated, wherein the at least one file is used for restoring the data from the frozen image; and
associating the at least one file with the frozen image.

4. The method of claim 3 wherein
the data are stored in a database;
the at least one file comprises:
   a control file for the database; and
   a log file for the database.

5. The method of claim 1 further comprising:
deleting an existing frozen image when the frozen image is generated.

6. The method of claim 1 wherein
causing the frozen image to be generated comprises causing a frozen image generator to generate the frozen image.

7. The method of claim 1 wherein
a server adds the entry to the catalog; and
a client of the server causes a frozen image generator to generate the frozen image.

8. The method of claim 1 wherein
the entry comprises metadata mapping a first version of the plurality of versions of the data to the frozen image.

9. The method of claim 8 wherein
the metadata mapping the first version to the frozen image comprises identification information for the first version and identification information for the frozen image.

10. The method of claim 1 further comprising:
logically rotating a plurality of storage areas to store a plurality of frozen images, wherein a respective frozen image is determined in accordance with a rotation schedule for the storage areas.

11. The method of claim 1 comprising:
restoring a portion of the data from the frozen image to production data.

12. A method comprising:
adding an entry for a frozen image of data in a catalog for tracking a plurality of versions of the data when the frozen image is generated; and
logically rotating a plurality of storage areas to store a plurality of frozen images, wherein a respective frozen image is determined in accordance with a rotation schedule for the storage areas.

13. The method of claim 12 further comprising:
causing the frozen image to be generated in accordance with a schedule.

14. The method of claim 13 further comprising:
capturing at least one file when the frozen image is generated, wherein the at least one file is used for restoring the data from the frozen image; and
associating the at least one file with the frozen image.

15. The method of claim 14 wherein
the data are stored in a database;
the at least one file comprises:
   a control file for the database; and
   a log file for the database.

16. The method of claim 12 further comprising:
deleting an existing frozen image when the frozen image is generated.

17. The method of claim 12 wherein
causing the frozen image to be generator comprises causing a frozen image generator to generate the frozen image.

18. The method of claim 12 wherein
a server adds the entry to the catalog; and
a client of the server causes a frozen image generator to generate the frozen image.

19. The method of claim 12 wherein
the entry comprises metadata mapping a first version of the plurality of versions of the data to the frozen image.

20. The method of claim 19 wherein
the metadata mapping the first version to the frozen image comprises identification information for the first version and identification information for the frozen image.

21. The method of claim 11 comprising:
restoring a portion of the data from the frozen image to production data.

22. A computer-readable medium comprising:
adding instructions configured to add an entry for a frozen image of data in a catalog for tracking a plurality of versions of the data when the frozen image is generated, wherein the plurality of versions of the data comprises:
   a first version of the data corresponding to the frozen image; and a second version of the data stored on a sequential access storage device; and the catalog comprises:
a first entry corresponding to the frozen image; and
a second entry corresponding to the second version.

23. A computer-readable medium comprising:

adding instructions configured to add an entry for a frozen image of data in a catalog for tracking a plurality of versions of the data when the frozen image is generated; and rotating instructions configured to logically rotate a plurality of storage areas to store a plurality of frozen images, wherein
a respective frozen image is determined in accordance with a rotation schedule for the storage areas.

24. A computer system comprising:

a processor to execute instructions; and a memory storing the instructions, wherein the instructions comprise:
adding instructions configured to add an entry for a frozen image of data in a catalog for tracking a plurality of versions of the data when the frozen image is generated; and rotating instructions configured to logically rotate a plurality of storage areas to store a plurality of frozen images, wherein
a respective frozen image is determined in accordance with a rotation schedule for the storage areas.

* * * * *